United States Patent
Castleberry

(10) Patent No.: US 7,660,936 B1
(45) Date of Patent: *Feb. 9, 2010

(54) ENABLING MULTIPLE ATA DEVICES USING A SINGLE BUS BRIDGE

(75) Inventor: James E. Castleberry, Boise, ID (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/031,558

(22) Filed: Feb. 14, 2008

Related U.S. Application Data

(63) Continuation of application No. 10/186,910, filed on Jun. 28, 2002, now Pat. No. 7,346,724.

(51) Int. Cl.
    *G06F 13/36* (2006.01)
(52) U.S. Cl. ............ 710/311; 710/305; 710/306
(58) Field of Classification Search .......... 710/311, 710/305–306, 10; 711/137
    See application file for complete search history.

(56) References Cited

U.S. PATENT DOCUMENTS

| | | | |
|---|---|---|---|
| 6,484,229 B1 | 11/2002 | Ichikawa et al. | |
| 6,618,788 B1 | 9/2003 | Jacobs | |
| 6,633,933 B1 | 10/2003 | Smith et al. | |
| 6,708,231 B1 * | 3/2004 | Kitagawa | 710/10 |
| 6,721,854 B1 * | 4/2004 | Asano et al. | 711/137 |
| 6,763,419 B2 | 7/2004 | Hoese | |
| 7,007,127 B2 | 2/2006 | Lin | |
| 7,032,054 B1 | 4/2006 | McGinnis et al. | |
| 7,346,724 B1 | 3/2008 | Castleberry | |
| 2002/0186706 A1 | 12/2002 | Chien et al. | |
| 2003/0046499 A1 | 3/2003 | Lin | |
| 2003/0196021 A1 * | 10/2003 | Botchek | 710/315 |
| 2004/0148461 A1 | 7/2004 | Steinmetz et al. | |
| 2004/0162921 A1 * | 8/2004 | Teow et al. | 710/10 |
| 2005/0165998 A1 | 7/2005 | Bolt et al. | |

OTHER PUBLICATIONS

U.S. Appl. No. 10/186,910 (CD02032): "Enabling Multiple ATA Devices Using a Single Sus Bridge" James E. Castleberry; filed on Jun. 28, 2002; 21 pages.
USPTO Notice of Allowance for U.S. Appl. No. 10/186,910 dated Oct. 10, 2007; 4 pages.
USPTO Advisory Action for U.S. Appl. No. 10/186,910 dated Aug. 6, 2007; 3 pages.
USPTO Final Rejection for U.S. Appl. No. 10/186,910 dated Jun. 4, 2007; 13 pages.
USPTO Non-Final Rejection for U.S. Appl. No. 10/186,910 dated Jan. 12, 2007; 12 pages.
USPTO Advisory Action for U.S. Appl. No. 10/186,910, dated May 24, 2006, 3 pages.

(Continued)

*Primary Examiner*—Mark Rinehart
*Assistant Examiner*—Kim T Huynh

(57) ABSTRACT

Embodiments of the invention include a bus bridge that is capable of communicating with more than one MSC device coupled to it. In some embodiments, the bridge includes a LUN processor that translates different LUN numbers received from the bus into different addresses and LUNs for devices connected to the bridge. The bridge masks the fact that multiple MSC devices are coupled to it by reporting to the host that only a single device having multiple LUNs are coupled to the bridge.

18 Claims, 3 Drawing Sheets

OTHER PUBLICATIONS

USPTO Final Rejection for U.S. Appl. No. 10/186,910 dated Mar. 10, 2006; 12 pages.
USPTO Non-Final Rejection for U.S. Appl. No. 10/186,910 dated Oct. 21, 2005; 11 pages.
USPTO Non-Final Rejection for U.S. Appl. No. 10/186,910 dated May 18, 2005; 11 pages.
USPTO Non-Final Rejection for U.S. Appl. No. 10/186,910 dated Sep. 29, 2004; 10 pages.

* cited by examiner

ENABLING MULTIPLE ATA DEVICES USING A SINGLE BUS BRIDGE

RELATED APPLICATION

This application is a continuation of U.S. pending application Ser. No. 10/186,910, filed Jun. 28, 2002, the entire disclosure of which is incorporated herein by reference.

TECHNICAL FIELD

This disclosure relates to peripheral devices and, more particularly, to enabling multiple ATA peripheral devices using a single bus bridge.

BACKGROUND

ATA devices are those that comply with an ANSI (American National Standards Institute) ATA standard, for instance the standard "AT Attachment with Packet Interface Extension—(ATA/ATAPI-4)" or one of its predecessors. The letters ATA are an acronym for "AT Attachment", based on a hard drive that was "attached" to the original IBM PC/AT. Sometimes ATA hard drives are also referred to as IDE (Integrated Drive Electronics) drives, indicating that a hard drive controller is integrated directly on the hard drive itself, and not on a separate board. There is no "official" IDE designation through ANSI, although the IDE name remains commercially popular.

The letters ATAPI stand for "ATA Packet Interface" and designate devices that operate on the same cable and bus as normal ATA devices, but communicate through the use of command packets. Most CD-ROMs and other type of mass storage drives conform to one of the ATAPI standards, and more specifically, to one of the ATA/ATAPI standards.

The ATA/ATAPI standards define the physical, electrical, transport, and command protocols for the attachment of devices to computers via an ATA bus. FIG. 1 shows a typical configuration for a computer 20 capable of using one or more ATA data devices. A host processor 22 communicates with main memory 24 over a frontside bus 28. The processor 22 (and main memory 24) can also communicate with a variety of other system peripherals through a PCI (Peripheral Component Interconnect) bridge 26 and a PCI local bus 30.

The bandwidth of the PCI local bus 30 can be shared by a variety of computer components, some of which are depicted in FIG. 1. For instance, internal PCI-compliant devices such as modems, sound cards, video cards, etc. can be attached to the computer 20 via a set of PCI card slots 32, 34, typically mounted directly on the computer motherboard. In addition, a USB (Universal Serial Bus) interface 36 typically provides a number of USB ports 38 for the attachment of a wide variety of external devices, such as a mouse, a keyboard, a digital camera, audio devices, printers, etc.

An ATA host adapter 40 performs signal conversion between the PCI local bus 30 and yet another bus, an ATA bus 42. Up to two ATA devices (e.g., devices 44 and 46 on FIG. 1) can share a single ATA bus 42. A primary device is known as device 0, or the "master" when two devices are present. A secondary device is known as device 1, or the "slave".

Another way to connect an ATA bus to the host computer 20 is through the USB bus. Specifically, FIG. 1 shows an ATA bus 52 connected through a USB/ATA-ATAPI bridge 50 to one of the USB ports 38. An ATA/ATAPI device 54 attaches to the ATA bus 52, which, as described above, is bridged to the USB bus through the USB/ATA bridge 50. Although providing the ATA bus 52 in this manner is convenient, a limit exists in that Mass Storage Class (MSC) definitions in the USB 2.0 specification limits the number of ATA devices able to be attached to a USB bus to one. This can be limiting because it may be desirable to attach more than one ATA/ATAPI devices to a USB bus. For instance, it would be convenient to hook an external CD-ROM drive and an external hard drive to a computer using only one of the USB ports 38.

Embodiments of the present invention allow more than one ATA/ATAPI device to be coupled to the USB bus.

SUMMARY OF THE INVENTION

Embodiments of the invention include a bus bridge that is capable of communicating with more than one MSC device. In some embodiments, the bridge includes a LUN (Logical Unit Number) processor that translates different LUN numbers received from the bus into different addresses and LUNs for devices connected to the bridge.

The foregoing and other features of the invention will become more readily apparent from the following detailed description of a preferred embodiment of the invention, which proceeds with reference to the accompanying drawings.

DETAILED DESCRIPTION

The USB 2.0 specification allows very high datarates. At up to 480 Mbps, it is 40 times the speed of the USB 1.1 specification of 12 Mbps. While USB 1.1 is very convenient to hook up peripheral devices to the computer, such as mice and keyboards, it lacks the bandwidth resources to effectively move large amounts of data in reasonable times. Therefore, hard drives, CD-ROM drives, DVD drives, tape drives, Zip drives, digital video cameras, etc. are restrained in their ability to effectively operate over the USB 1.1 bus, because of its limited dataspeed.

Although the dataspeed of a USB 2.0 bus is fast enough to handle multiple ATA/ATAPI devices, the Mass Storage Class (MSC) definition used by the USB 2.0 specification allows only a single ATA/ATAPI device to be connected to a USB bus. The MSC specification assumes that each MSC device is a single physical unit, and provides no possibility for multiple physical devices in a single MSC device.

As stated above, the ATA/ATAPI standards provide for up to two physical ATA devices attached to a single ATA bus interface. Embodiments of the invention overcome the MSC specification limitation of allowing only one ATA physical device to attach to the USB bus, and allow two physical ATA devices to attach to a USB 2.0 bus. Additionally, some embodiments of the invention allow multiple ATA busses to be coupled to the USB bus, and each of the ATA busses can have two physical ATA devices attached.

According to embodiments of the invention, multiple separate physical ATA/ATAPI devices are made to appear to the USB 2.0 bus as a single MSC device.

Figure 1:
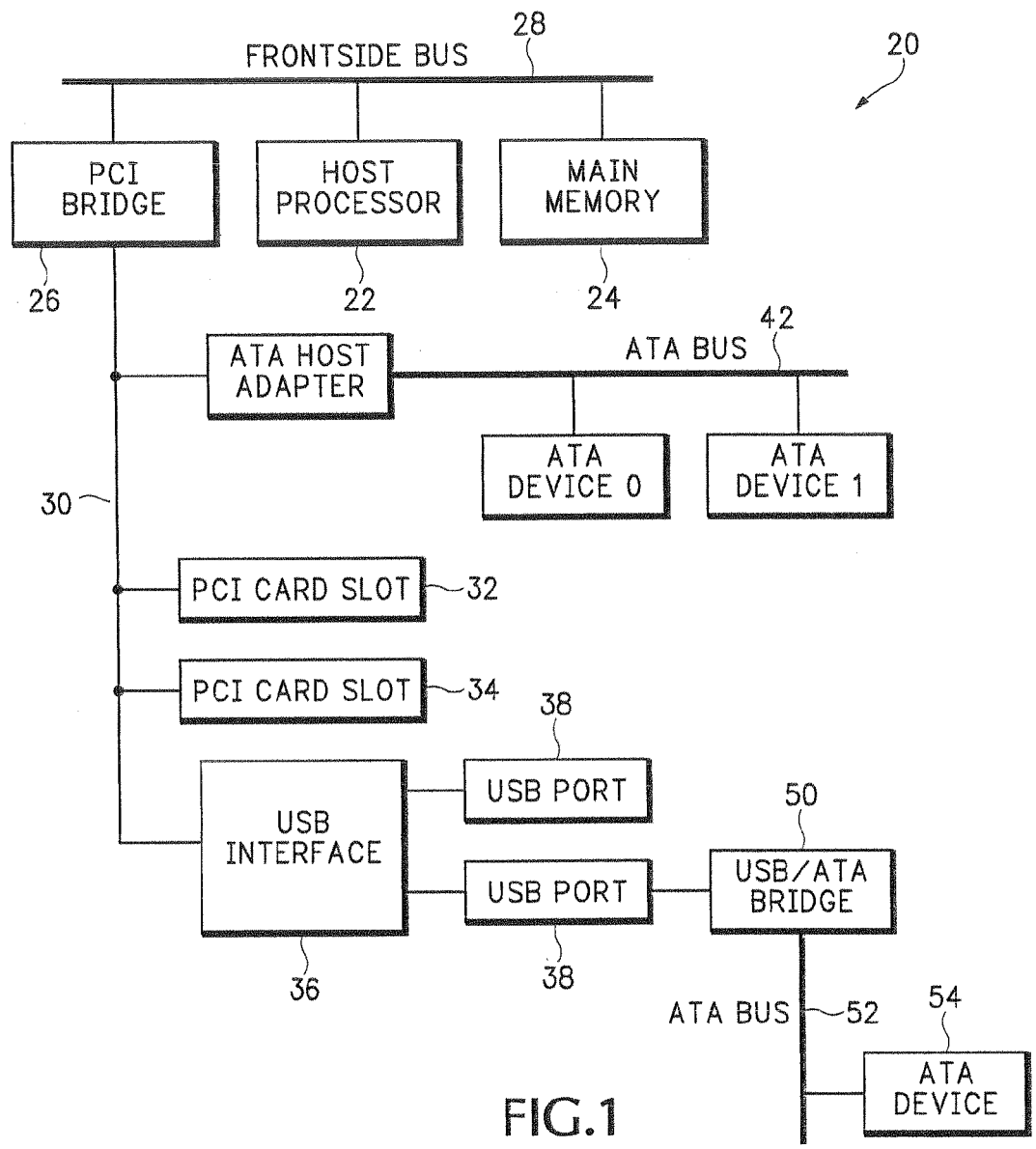
FIG. 1 is a functional block diagram of a known computer system including an ATA/ATAPI bus and a USB bus.
Figure 2:
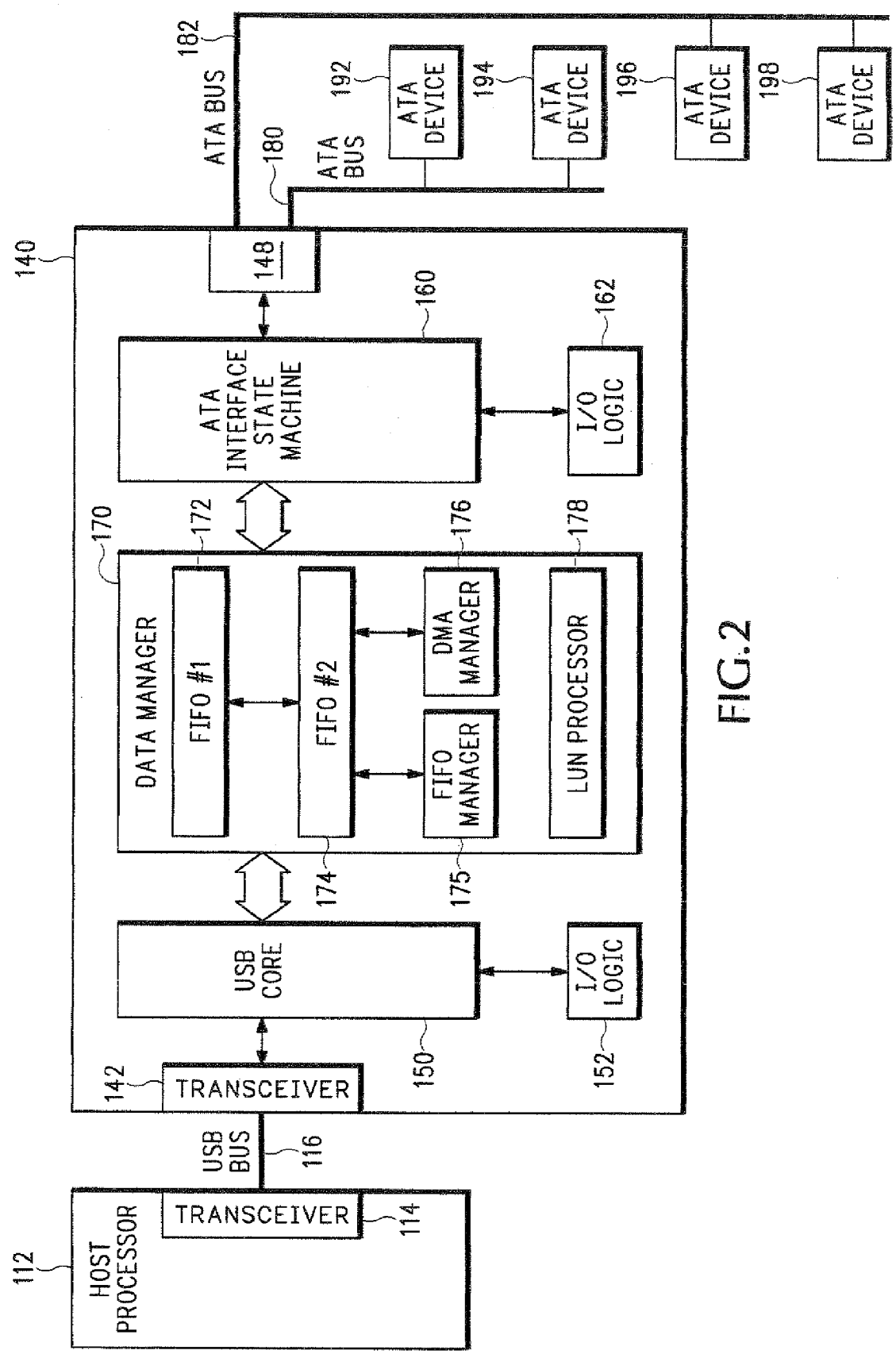
FIG. 2 is an example functional block diagram of a computer system including a USB bus bridge that is able to be coupled to two ATA/ATAPI devices, according to embodiments of the invention.

FIG. 2 is a functional block diagram illustrating embodiments of the invention. A computer system 440 has a host computer 112, which includes a USB bus transceiver interface 114 to couple to a USB bus 116. The USB bus 116 accords to the USB 2.0 specification, or another bus specification that can have ATA/ATAPI devices attached to it.

The bus 116 is also coupled to a USB—ATA/ATAPI bus bridge (bridge) 140, which contains hardware, firmware, and/or processes operating to allow commands and data to be passed between the USB bus 116 and an ATA bus 180. Some embodiments, like the embodiment shown in FIG. 2, allow more than one ATA bus to be coupled to the bridge 140. In FIG. 2, two busses, 180 and 182 are so connected, although the invention is not limited to having only two ATA busses.

Coupled to each of the ATA buses 180, 182 are two ATA/ATAPI devices. Devices 192 and 194 are coupled to the ATA bus 180, and devices 196 and 198 are coupled to the ATA bus 182. The devices 192-198 in fact may be either ATA or ATAPI devices, but will be referred to as ATAPI devices, while the busses 180, 182 will be referred to as ATA, for clarity. Either the busses or the devices could be either ATA or ATAPI.

The bridge 140 thus couples multiple devices to a bus, for example the bridge 140 of FIG. 2 couples four ATAPI devices 192, 194, 196 and 198 to the USB bus 116. More specifically, the bridge 140 includes functions, which can be implemented in hardware, firmware or software, which cause the connected ATA devices 192-198 to appear as a single MSC device to the USB 2.0 port on the host computer 112. Therefore, as it appears to the USB bus 116, there is only a single physical ATA device coupled to it, while in actuality, there can be many such devices.

Returning back to FIG. 2, the bridge 140 includes a transceiver 142 that couples to and receives signals from the USB bus 116. The transceiver 142 is coupled to a USB core 150, which contains the functions and logic used to communicate to the USB bus 116. The USB core 150 is also attached to an I/O processor 152, which decodes the commands and data from the USB bus 116, and encodes commands and data from the bridge 140 to be transmitted over the bus 116.

Coupled to the ATA buses 180, 182 is another transceiver 148. The transceiver is used to accept command and data signals from and to place command and data signals on the ATA buses 180, 182. The transceiver 148 is coupled to an ATA interface state machine 160, which is used to encode ATA commands to be sent to the transceiver 148, as well as receive ATA commands from the transceiver. Attached to the ATA state machine 160 is an additional I/O logic 162 used to manage the actual input and output of data and commands from the ATA busses 180, 182.

Coupled between the USB core 150 and the ATA state machine 160 is a data manager 170. Included in the data manager 170 are FIFO queues 172, 174 as well as a FIFO manager 175 and a DMA manager 176. Data that is input from the USB bus 116 is routed by the FIFO and DMA managers 175, 176 into an appropriate FIFO queue 172, 174. Data can be transferred from the FIFO queues 172, 174 to either of the USB core 150 or the ATA state machine 160 as is needed to transfer between the USB bus 116 and the ATA busses 180, 182.

Additionally included in the data manager 170 is a Logical Unit Number (LUN) processor 178. The LUN processor 178 includes functions that allow data and commands to be routed to a particular ATAPI device 192-198, while still appearing to the USB bus 116 that there is only a single MSC device coupled to it.

One method to cause multiple ATAPI devices to appear as a single ATAPI device is to route data and commands to a particular ATAPI device by Logical Unit Number, or LUN. Although the MSC definitions only allow for a single device coupled to a USB bus, it does not prohibit a single device from having multiple LUNs. The LUN processor 178 of the bridge 140 is structured to manage all of the LUNs of all of the ATAPI devices 192-196 coupled to the bridge 140. Specifically, the LUN processor 178 includes internal tables or functions that assign particular LUN numbers to exactly one of the coupled ATAPI devices 192-196. Then, when a command or data comes from the USB bus 116 directed to a specific LUN, the LUN processor 178 routes it to the device address of the particular ATAPI device 192, 194, 196, or 198 that is associated to the LUN specified by the bus 116.

An ATA device only has one possible LUN, that is, LUN 0; while an ATAPI device may have up to 8 different LUNs. When the bridge 140 is initialized, in one embodiment, the LUN processor 178 will report to the host USB bus 116 that it has one MSC device that has a number of LUNs that equals the total number of LUNs in all of the LUNs of the attached ATAPI devices 192-198. In another embodiment, the LUN processor 178 reports to the host USB bus 116 that it has one MSC device that has a number of LUNs that equals the total number of ATA/ATAPI devices coupled to the bridge 140. Detailed description of the different embodiments follows.

LUN information from the ATAPI devices could be supplied by preset configuration bits, or the LUN processor 178 could detect this information at startup. In this embodiment, the LUN processor 178 requests that each ATAPI device 192-198 attached to it report its total number of LUNs, as well as to which ATA bus 180, 182 it is connected. Further, the LUN processor determines whether the ATAPI device 192-198 is the master or the slave on the particular ATA bus 180, 182. Once this data is received from the ATAPI devices 192-198, in some embodiments, the LUN processor 178 creates a table associating the address of each of the ATA/ATAPI devices with a particular LUN or set of LUNs. For instance, if each of the ATAPI devices 192-198 has three LUNs each, the LUN processor 178 may build a table similar to the following Table 1:

TABLE 1

| REPORTED LUN | ACTUAL LUN | ATA BUS | ATAPI DEVICE |
|---|---|---|---|
| 0 | 0 | 180 | master (192) |
| 1 | 1 | 180 | master (192) |
| 2 | 2 | 180 | master (192) |
| 3 | 0 | 180 | slave (194) |
| 4 | 1 | 180 | slave (194) |
| 5 | 2 | 180 | slave (194) |
| 6 | 0 | 182 | master (196) |
| 7 | 1 | 182 | master (196) |
| 8 | 2 | 182 | master (196) |
| 9 | 0 | 182 | slave (198) |
| 10 | 1 | 182 | slave (198) |
| 11 | 2 | 182 | slave (198) |

After the LUN processor 178 gets the LUN information from the ATAPI devices connected to the bridge 140, the LUN processor directs the bridge to report to the host USB bus 116 that a single MSC device is attached to it, and the single MSC device has a number of LUNs equal to the total number of LUNs of all the ATAPI devices connected to it. For example, in the example shown in Table 1 above, the LUN processor 178 would report a single MSC device, having 12 LUNs, numbered 0-11. The LUN processor 178 will re-map commands and data directed to the reported LUN numbers into the actual LUN numbers for the particular device loaded on a particular ATA bus, as discussed below.

In ATA/ATAPI protocols, commands for the ATAPI device are contained in a Command Descriptor Block (CDB), A field within the CDB block identifies the LUN that the USB host is communicating to, which will be one of the "actual" LUNs reported to the host from the above table. For example, in the above table, the CDB or ATAPI LUN will be "0", "1" or "2".

Additionally, CDBs sent over USB bus protocols are wrapped in a Command Block Wrapper (CBW). In addition to the CDB itself, the CBW contains other data describing the CDB. One of the pieces of data in the CBW that describes the CDB is a LUN number, which will be called the CBW LUN. In systems with only one ATAPI device, the CBW LUN would always match the CDB LUN. Typically, a USB/ATA bridge would retrieve the CBW LUN from the CBW, and copy the CBW LUN to a Dev/Head register (which will be referred to as the Dev/Head LUN), as is known in the art. Then, the Dev/Head register and the CDB LUN would be used by the ATAPI device to identify which LUN the particular command was being sent to.

In embodiments of the invention, however, where there is more than one ATAPI device connected to the USB bus 116, the LUN processor 178 remaps the CBW LUN into the proper "actual" LUN before copying the "actual" LUN into the Dev/Head register. The same is true in reverse for data originating from one of the ATAPI devices 192-198, in that the LUN processor 178 will remap the "actual" LUN that the data came from into the "reported" LUN prior to sending it over the USB bus 116.

Thus, between the bridge 140 and the host device, the CBW LUN will be one of the "reported" LUNs from the above table, while, between the bridge 140 and the ATAPI device 192-198, the actual LUN for the particular device will be in the Dev/Head register.

For speed and ease of implementation, however, at least some of the embodiments of the invention choose never to open the CDB block to determine which ATAPI LUN is contained therein. Rather, the LUN processor 178 maps the "reported" CBW LUN ant maps the "actual" LUN into the Dev/Head register prior to sending it to the proper ATAPI device 192-196.

The ATA/ATAPI specifications provide three ways to manage the interaction between the CDB LUN, the CBW LUN and the Dev/Head LUN (register). The first method is that the CDB LUN always contains a 0 LUN, and the Dev/Head LUN contains the actual LUN of 0-7 desired within the proper device. Recall that each ATAPI device can have a maximum of 8 LUNs, and that each ATA bus can reference a maximum of 16 separate LUNs (two ATAPI devices).

The second method is that the Dev/Head LUN always contains a 0 LUN, and the CDB LUN contains the actual LUN of 0-7 desired within the proper device.

The third method is that both the Dev/Head LUN and the CDB LUN contain the actual LUN of 0-7 desired within the proper device. This method is not used when the bridge 140 according to embodiments of the invention is coupled to more than one ATAPI device, however.

Logically, there is a fourth method, specifically where neither the Dev/Head LUN nor the CDB LUN contains a zero, and both LUNs are non-zero. However, this scenario is not supported in the ATAPI specifications, and would therefore be vendor specific for custom installations.

In practice, the LUN processor 178 can implement any of the above implementations, but the processor would obviously need to know beforehand which of the methods the host computer 112 accords to.

If the host computer 112 and USB bus 116 implements the first method, where the CDB LUN always contains 0, then the LUN processor 178 effectively remaps the CBW LUN (reported LUN) as the actual LUN into the Dev/Head LUN, according to table 1 above. For example, if the CBW LUN is "9", the LUN processor 178 will insert a "0" into the Dev/Head LUN, and then address the CDB that was in the CBW to ATAPI device 198, which is the slave on the ATA bus 182. If instead the CBW LUN was "1", the LUN processor 178 would insert a "1" in the Dev/Head register, and address the CDB that was in the CBW to ATAPI device 192, which is the master on the ATA bus 180. Currently, operating systems such as Microsoft WINDOWS, Apple Computer's MAC-OS, and LINUX all implement the first method of addressing ATAPI devices, so most likely the above-described first method would be used.

If, however, the host computer 112 and USB bus 116 implements the second method, then the LUN processor 178 would report a different table to the host computer when the bridge 140 was initialized, and use this different table in translating LUNs.

Using this second method, because the CDB LUN will always be used to select the actual LUN within the desired ATAPI device, the LUN processor 178, at the time the bridge 140 is initialized, need only report as many LUNs as there are physical ATAPI devices. In the example embodiment shown in FIG. 2, there are four physical ATAPI devices, 192, 194, 196, and 198. Therefore, the LUN processor 178 would send a table such as the table 2.

TABLE 2

| REPORTED LUN | ATA BUS | ATAPI DEVICE |
| --- | --- | --- |
| 0 | 180 | master (192) |
| 1 | 180 | slave (194) |
| 2 | 182 | master (196) |
| 3 | 182 | slave (198) |

Using this method, the LUN processor 178 need only decode the LUN contained in the CBW block into the proper bus and device address. Then, the LUN processor 178 will always insert a "0" into the Dev/Head LUN prior to sending the CDB onto the properly addressed ATAPI device 192, 194, 196 or 198. The CDB LUN is then used at the device to select the proper LUN within the actual device.

Figure 3:
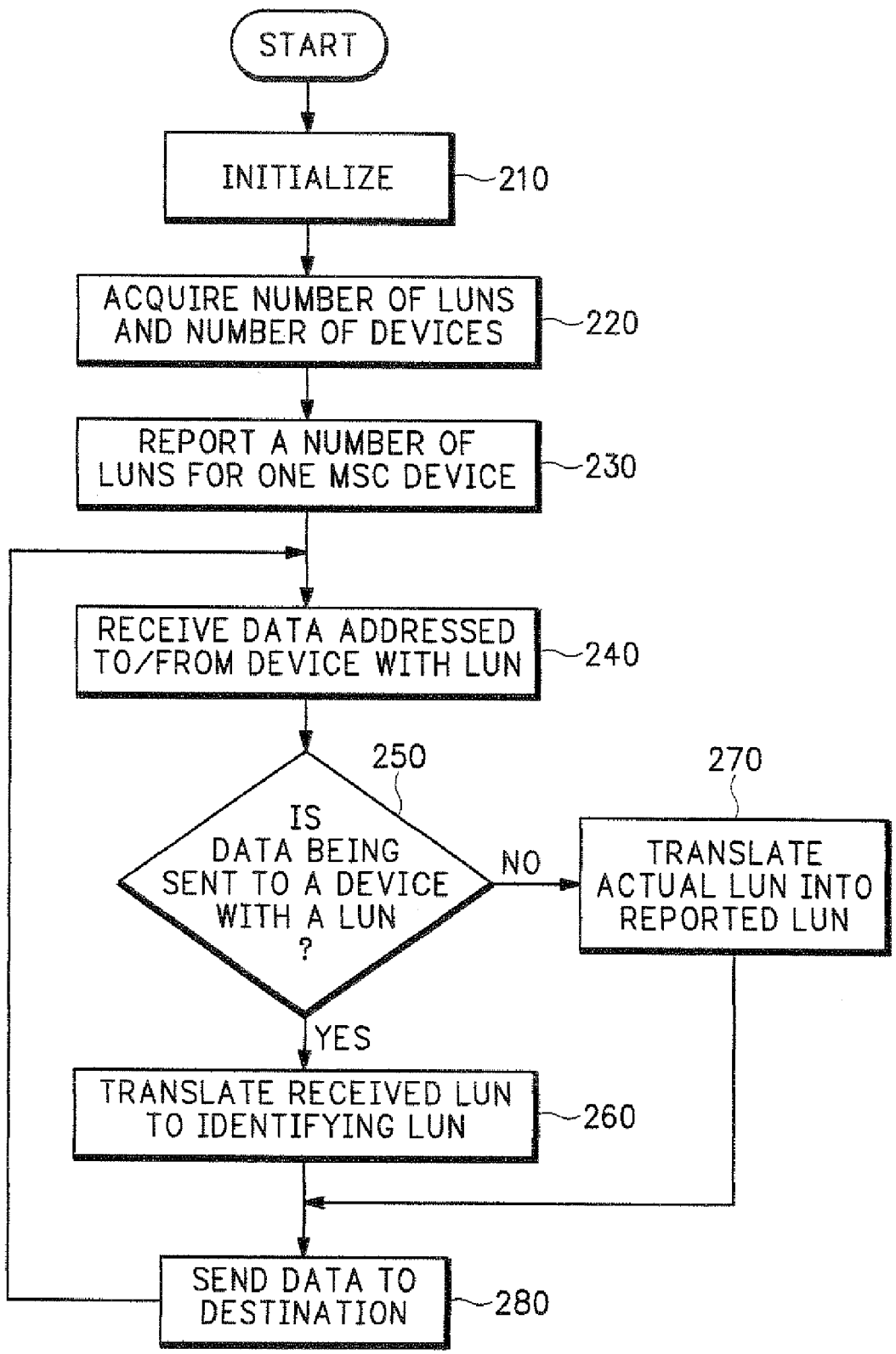
FIG. 3 is an example flow diagram illustrating processes that can be performed by the USB bus bridge of FIG. 2.

FIG. 3 is an example flow diagram that illustrates processes that can be performed by the LUN processor 178 of FIG. 2. A flow includes an initialization 210, where the LUN processor determines how many ATA/ATAPI devices are connected to it, and what the LUNs of the connected devices are. The initialization could be performed when the computer system 112 (FIG. 2) is first turned on, or when a USB bus reset occurs, for instance when a new device is plugged into the USB bus 116. The initialization could include the LUN processor 178 sending a command to instruct the ATA/ATAPI devices to respond with all of the pertinent information. Or, for example, the LUN processor 178 could read information from registers describing the preset setup information, such as the total number of devices and the different LUNs of the devices. Whatever the manner of initialization, by the end of the initialization, the LUN processor 178 knows how many different ATA busses are connected to it, and how many ATAPI devices are on each of the ATA busses.

In a process 220, the LUN processor 178 determines how many LUNs to report, based on at least two factors. First the number of ATAPI devices and how many individual LUNs they contain will determine the number of LUNs. In the case where the host computer 112 operates as described in method 1 above, then the number of LUNs reported will equal the total number of LUNS for all of the ATAPI devices connected to the bridge 140. If instead the host computer operates as described in method 1 above, then the number of LUNs reported will equal the number of ATAPI devices connected to the bridge 140.

Once the number of LUNs is specified and the proper tables generated, the LUN processor 178 reports the correct number of LUNs to the host computer 112 in a process 230.

The flow then repeats the processes 240-280 until the bus is reset or the host computer shuts down. In processor 240, the LUN processor 178 receives data destined for or originating from an ATA or ATAPI device. A check 250 is performed to see if it is data being directed to an ATA or ATAPI device. If so, then in process 260 the reported LUN contained in the CBW is decoded into the actual LUN of the desired device, a LUN inserted in the Dev/Head register as described above, and the command is sent to the address of the proper device. If instead the data was from the ATA or ATAPI device, then in a process 270, the LUN processor 278 removes the actual LUN from the device and inserts instead the reported LUN, according to its internal tables. That way, to the host computer 1112, it appears as if there is a single MSC device having many multiple LUNs, while in actuality, the LUN processor 128 is performing translating of LUN to multiple different devices. In a process 280, the data is sent along to its original destination, i.e., the desired device or the host computer.

Specific exemplary embodiments disclosed may have been described with reference to particular hardware and functions. For example, a LUN processor, as well as a USB core and a ATAPI state machine have been described. However, no such requirement is made that these functions be separate, or, in some cases, even be present at all. For example, some of the functions can be performed by a single circuit, or could even be processes running from firmware or on a dedicated processor. Also, specific LUN translation methods have been shown as examples, but the methods of LUN processing, or, indeed, the necessity to use LUNs as a selecting mechanism at all is not necessary for all embodiments of the invention.

It should be apparent to those skilled in this art that the disclosed embodiments are exemplary and that various changes and modifications may be made thereto as become apparent by the present disclosure. Accordingly, such changes and modifications are considered to fall within the scope of the appended claims.

What is claimed is:

1. A USB (Universal Serial Bus) to ATA/ATAPI (AT Attachment/AT Attachment with Packet Interface) bridge, comprising:
   a first transceiver configured to communicate with a host USB bus;
   a second transceiver configured to communicate with an ATA (AT Attachment) bus having more than one device coupled thereto; and
   a routing circuit coupled to the first and second transceivers, configured to route signals between the ATA bus and the host USB bus, and configured to total a number of LUNs (Logical Unit Numbers) for all devices coupled to the ATA bus and report the total to the host USB bus.

2. The bridge of claim 1 wherein the routing circuit causes signals from the ATA bus appear to the host as if they come from a single device.

3. The bridge of claim 2 wherein the routing circuit is structured to route signals to a device based on a LUN table stored in the routing circuit.

4. The bridge of claim 1 wherein the routing circuit is configured to total a number of devices coupled to the ATA/ATAPI bridge, and report the total to the host USB bus.

5. The bridge of claim 1 wherein the routing circuit includes functions relating LUNs of the devices coupled to the ATA bus to LUNs on to the host USB bus.

6. The bridge of claim 3 wherein the routing circuit is structured to decode a LUN passed from the host USB bus into a LUN number and an address of a device coupled to the ATA bus.

7. The bridge of claim 1 wherein the second transceiver is configured to communicate with multiple ATA buses.

8. The bridge of claim 1 wherein at least one of the devices coupled to the ATA bus comprises more than one LUN.

9. A USB (Universal Serial Bus) bridge, comprising:
   a first port configured to send signals to and receive signals from a USB host;
   a second port configured to send signals to and receive signals from an ATA (AT Attachment) bus having more than one ATA/ATAPI (AT Attachment with Packet Interface) device coupled thereto; and
   a LUN (Logical Unit Number) coder coupled to the ports and structured to route signals to a particular device on the ATA bus based on a LUN, and wherein one or more of the ATA/ATAPI devices coupled to the ATA bus has more than one LUN.

10. The USB bridge of claim 9 wherein the LUN coder totals all of the LUNs of all of the ATA/ATAPI devices that are connected to the USB bridge, and reports to the USB host that the bridge is connected to a single MSC (Mass Storage Class) device having a number of LUNs equal to the total.

11. The USB bridge of claim 9 wherein the LUN coder totals the number of ATA/ATAPI devices connected to the USB bridge, and reports to the USB host that the USB bridge is connected to a single MSC (Mass Storage Class) device having a number of LUNs equal to the total.

12. The USB bridge of claim 9 wherein the LUN coder comprises a LUN table.

13. The USB bridge of claim 12 wherein the LUN coder causes signals from the ATA bus appear to the host as if they come from a single device.

14. A method for communicating with a plurality of ATA/ATAPI (AT Attachment/AT Attachment with Packet Interface) devices over a host USB (Universal Serial Bus) bus utilizing a single bridge, comprising:
   accepting a signal from the host USB bus addressed to one of the plurality of ATA/ATAPI devices coupled to the host USB bus, wherein at least one of the plurality of ATA/ATAPI devices has more than one LUN (Logical Unit Number); and
   routing the signal to the one of the plurality of ATA/ATAPI devices.

15. The method of claim 14, further comprising receiving signals from more than one of the plurality of ATA/ATAPI devices.

16. The method of claim 15, further comprising making it appear to the host USB bus as if the signals originate from a single ATA/ATAPI device.

17. The method of claim 14 wherein routing the signal to the one of the plurality of ATA/ATAPI devices comprises routing to the one of the plurality based on the LUN sent by the host USB bus.

18. The method of claim 17, wherein routing to the one of the plurality of ATA/ATAPI devices comprises:
   sending a command and a referenced LUN to a bridge;
   decoding the referenced LUN to an actual LUN and an address; and
   sending the command to the actual LUN and the address.

* * * * *